United States Patent
Eakins et al.

(10) Patent No.: US 11,316,554 B2
(45) Date of Patent: Apr. 26, 2022

(54) MULTI-ANTENNA DETECTION, LOCALIZATION, AND FILTERING OF COMPLEX TIME-AND-DOPPLER-SHIFTED SIGNALS

(71) Applicant: Rincon Research Corporation, Tucson, AZ (US)

(72) Inventors: Benjamin Eakins, Tucson, AZ (US); Brecken Uhl, Tucson, AZ (US)

(73) Assignee: Rincon Research Corporation, Tucson, AZ (US)

( * ) Notice: Subject to any disclaimer, the term of this patent is extended or adjusted under 35 U.S.C. 154(b) by 245 days.

(21) Appl. No.: 16/432,567

(22) Filed: Jun. 5, 2019

(65) Prior Publication Data

US 2020/0386851 A1 Dec. 10, 2020

(51) Int. Cl.
*H04B 1/709* (2011.01)
*H04B 1/7097* (2011.01)
*H04B 1/10* (2006.01)

(52) U.S. Cl.
CPC ............. *H04B 1/7097* (2013.01); *H04B 1/10* (2013.01)

(58) Field of Classification Search
CPC ....... H04B 1/7097; H04B 1/10; G01S 5/0215; G01S 5/06; G01S 11/10
See application file for complete search history.

(56) References Cited

U.S. PATENT DOCUMENTS

| | | | | |
|---|---|---|---|---|
| 4,027,247 | A * | 5/1977 | Aranguren | H04B 7/084 375/331 |
| 6,400,756 | B2 * | 6/2002 | Schilling | H04L 1/06 375/148 |
| 7,006,529 | B2 * | 2/2006 | Alastalo | H04B 7/0842 370/345 |
| 8,351,534 | B2 * | 1/2013 | Mussmann | H04L 27/2675 375/267 |
| 9,143,136 | B2 * | 9/2015 | Tekin | H03B 5/1228 |
| 9,780,440 | B2 * | 10/2017 | Onaka | H01Q 1/50 |
| 2009/0003489 | A1 * | 1/2009 | Li | H04L 25/0242 375/316 |
| 2009/0251368 | A1 * | 10/2009 | McCune, Jr. | H01Q 3/38 342/368 |
| 2010/0272207 | A1 * | 10/2010 | Zangi | H04B 7/0413 375/267 |
| 2019/0342126 | A1 * | 11/2019 | Hadani | H04L 1/0054 |
| 2020/0205116 | A1 * | 6/2020 | Zhang | H04L 1/203 |
| 2020/0322202 | A1 * | 10/2020 | Hadani | H04L 27/2613 |

* cited by examiner

*Primary Examiner* — Jean B Corrielus
(74) *Attorney, Agent, or Firm* — Quarles & Brady LLP

(57) ABSTRACT

Systems and methods for detecting, localizing, and filtering signals such as radiofrequency signals using an array of antennas are disclosed. Input signals each containing a signal of interested are received, along with a reference signal sharing one or more characteristics of the signal-of-interest. Predetermined time delays and frequency shifts are applied to the input signals such that the signal-of-interest components of the signals are synchronized and to cancel any Doppler-shifting between the signal-of-interest components. A filtering process is employed to filter the shifted input signals and sum them such that a metric indicating the degree of difference between the reference signal and the summed filtered signals (such as the mean squared error, for example) is minimized.

12 Claims, 10 Drawing Sheets

MULTI-ANTENNA DETECTION, LOCALIZATION, AND FILTERING OF COMPLEX TIME-AND-DOPPLER-SHIFTED SIGNALS

FIELD OF THE INVENTION

The present disclosure relates to signal processing and communications techniques for detection of signals and noise reduction.

BACKGROUND

With the proliferation of wireless communication technologies, filtering out interference from a desired received signal has become challenging. The task of detecting a desired signal of interest while subtracting unwanted interference is further complicated when the environment is full of numerous moving and stationary sources of interference and the signal or signals of interest also originate from sources which may be either moving or stationary with respect to a receiver. Furthermore, these interfering signals may be challenging to even identify, because many modern devices employ spread-spectrum and other complex modulation strategies.

Conventional approaches make use of fixed characteristics of the signal of interest to distinguish it from sources of interference. For example, when the desired signal is bandwidth-limited, noise and interference reduction can be accomplished by filtering out signals that are out-of-band. Such approaches may work well when the interference sources have stable spectral characteristics over time (such as an AM-radio transmission with a fixed carrier frequency or an FM-radio transmission with a fixed center frequency) or when multiple signals are well-separated in frequency. However, these techniques fail if the desired signal and/or the interference signals do not have a well-defined bandwidth. Other conventional approaches rely on excluding interference signals that originate from a signal point, an area in space, or from an emitter moving along a predefined trajectory. A trivial example of such an approach is a mechanically-steerable directional antenna. More sophisticated conventional approaches operate an array of physically separated antennas as a single electronically-steerable directional antenna.

Conventional approaches utilize multiple receiving elements (i.e., antenna arrays) to detect signals in time difference of arrival (TDOA) and/or frequency difference of arrival (FDOA) space and compute a cross-ambiguity function. The time difference of arrival of a signal at two, spaced-apart antenna elements can be estimated by (1) guessing at a TDOA for a suspected emitter (which involves guessing at the location of a suspected emitter relative to the receiving antennas), (2) applying the guessed TDOA as a time delay to one of the received signals, and (3) computing the cross correlation of the resulting two signals (the received signal and the time-delayed signal). In the event that the TDOA guess was correct, the value of the correlation will be large. This process can be repeated for additional TDOA delay values, generating a plot of TDOA and amplitude of the cross correlation, which may reveal the TDOA of the emitter. If the signal has a TDOA and an FDOA (i.e., if the emitter is moving differently with respect to one antenna element versus the other, either because of antenna motion, or emitter motion, or both), the same process can be done to find the signal in FDOA space, i.e., frequency shift one of the antennas and see if the resulting signals correlate. By varying both time delay and frequency shift terms, and correlating the resulting antenna outputs, a grid showing peaks associated with signal emitters in FDOA/TDOA space can be generated.

This process is called the computation of the cross-ambiguity function, and is explained in greater detail below. A similar conventional method exists for detecting cyclostationary signals, i.e., signals that have time-varying characteristics that are periodic over a sufficiently long time period.

These conventional approaches to detecting and filtering out unwanted interference have shortcomings. Unwanted interference may originate from sources which are moving relative to the receiver, making those sources difficult to exclude on the basis of directionality. In addition, many modern communication devices transmit using modulation techniques that produce signals without well-defined spectral characteristics. As a simple example, some communications systems employ pseudo-random carrier frequency hopping. Signals transmitted by such frequency-hopping sources do not have a well-defined bandwidth because the signal occupies different portions of the spectrum at different times.

SUMMARY OF THE INVENTION

Improved techniques for filtering out unwanted interference are disclosed herein, which make use of the statistical properties of signals transmitted using modern modulation modalities in order to suppress noise from interference and isolate a signal of interest. By exploiting general statistical properties of interfering signals over long time periods, such improved techniques can detect and locate sources of these signals. Because these interfering signals in general will not share the exact characteristics of a similar signal of interest, unwanted interference can be reduced or eliminated by effective detection and localization of a desired signal source's current location and velocity.

Improved techniques disclosed herein may exploit the fact that many signals transmitted using modern communication systems are cyclostationary, meaning they have time-varying characteristics that are periodic over a sufficiently long time period. As a simple example, a single-frequency tone (e.g., a sine wave) transmitted using a pseudo-random sequence of carrier sequences will have different spectral characteristics during each interval using a new carrier frequency. Accordingly, such a signal is difficult to isolate or suppress using conventional spectral filtering. However, such a signal may be cyclostationary. In this case, for communication using pseudo-random carrier hopping to be successful, the transmitting party and any intended receivers must share the pseudo-random sequence used to choose the carrier frequencies. In practical systems, these sequences are finite and relatively short. Once the transmitter has cycled through all the carrier frequencies in the sequence, it begins to cycle through the same sequence from the beginning. This long time-base periodicity means that the signal is cyclostationary, which in turn means that, while the signal at one moment may have no discernible relationship to the signal at another moment shortly thereafter, the segment of the signal at some time $t_1$ will be identical to a segment of the signal at some earlier time $t_0$. If the signal is complex (potentially containing random data, for example), this may not be strictly true; however, the signal during an interval around $t_1$ will still be highly correlated to the signal during an interval around $t_0$. Such signals are frequently referred to as cyclostationary according to some definitions and as "approximately" or "widely" cyclostationary in others. Hereinafter, the term "cyclostationary" will be used to mean signals having statistical properties which are cyclical in time, i.e., either cyclostationary or approximately cyclostationary.

In methods and systems according to inventive embodiments, signals are detected, located, and tracked and then filtered using an array of antennas placed sufficiently far from each other, which sample the signal over a sufficient time period. The signals are filtered using an adaptive filter generation procedure which produces filters such that, when the filtered signals are combined to form an estimated signal of interest, an error between the estimated signal and a reference signal is minimized. The optimal filter generation procedure may utilize properties of cyclostationary signals for improved performance when cyclostationary signals may be present.

In methods and systems according to inventive embodiments, an array of receiving antennas is provided. Each receiving element is located in a different position relative to a location, which means that each antenna in an array receives the signal at a different time relative to the other one or more antenna elements. Additionally, if there is relative motion between the signal source and the antenna array (i.e., if the source is moving or one or more antenna array elements are moving), the frequency of the received signal will be shifted up or down depending on the magnitude and sign of the velocity vector component pointed between the emitter and the antenna element, (i.e., the signal is received with a Doppler shift).

When the signals from each of the antennas are summed together with an appropriate time-delay and frequency-correction applied to the signal from each individual antenna, an enhanced version of the original signal will be reproduced. Because the source(s) of any interference signals will most likely be spatially separated from the source of the signal of interest, and because it is also unlikely that interference sources will be moving in identical directions at identical speeds relative to the antennas as the source of the signal of interest, the interference signals from the individual antennas will tend to cancel each other out. Thus if the location and relative velocity of a cyclostationary signal is known, interference can be effectively filtered out if the TDOA, FDOA, and, optionally, the cyclostationary period, is known or can be determined.

Embodiments herein disclosed methods and apparatus for reducing noise in a known signal when the noise comprises unknown cyclostationary and other signals. Conversely, additional embodiments disclosed herein apply computational techniques to apply numerous combinations of potential time delay, frequency shift values, cyclostationary rate, and filtering to the output from an antenna array and perform statistical analyses to identify previously unknown or undetected cyclostationary and other signal sources.

In an example embodiment, a method of detecting a signal of interest (SOI) comprises providing a plurality of spaced-apart receiving antennas; and receiving, from the plurality of spaced-apart receiving antennas, respective input signals containing the signal of interest. The method further comprises generating shifted input signals by applying time delays to the respective input signals of a magnitude sufficient to synchronize a signal arriving at the receiving antennas from a predetermined position, and applying frequency shifts to the respective input signals sufficient to cancel a Doppler frequency shift induced in the input signals by an emitter moving in a predetermined manner with respect to the receiving antennas.

The method further comprises receiving a reference signal sharing at least a first characteristic with the SOI; applying a set of respective filters to the shifted and delayed input signals and summing resultant filter outputs to produce an output signal. The set of respective filters is selected to minimize an error metric indicating a degree of difference between the output signal and the reference signal.

In another example embodiment, a method of detecting a signal of interest (SOI) comprises providing a plurality of spaced-apart antenna elements receiving a composite signal including the SOI; generating a plurality of input signals; applying, to each input signal, a first time delay and a first frequency shift, resulting in a plurality of time-delayed and frequency-shifted signals; receiving a reference signal; forming and applying filters for each of the plurality of time-delayed and frequency-shifted signals; and summing the filtered time-delayed and frequency-shifted signals. Forming the filters comprises computing filter coefficients by supplying the time-delayed and frequency-shifted signals to a multidimensional Wiener filter.

In another example embodiment, a method of detecting unknown signals comprises receiving initial cross ambiguity function (CAF) data, each initial CAF datum indicating a degree of correlation between a reference input signal and a second input signal upon application of a particular time delay and a particular frequency shift to the second input signal. The method further comprises generating a shifted input signal for each initial datum by applying the time particular delay and the particular frequency shift corresponding to that initial datum to the second input signal; generating a filtered reference signal for each initial datum by computing a first filter and applying the first filter to the reference signal; and generating a filtered input signal for each initial datum by computing a second filter and applying the second filter to the input signal. The first filter is computed such that application of the first filter to the reference input signal minimizes an error metric indicating a degree of difference between the filtered reference signal and the shifted input signal. The second filter is computed such that application of the second filter to the shifted input signal minimizes an error metric indicating a degree of difference between the filtered input signal and the reference input signal.

The method further comprises computing, for each initial datum, refined CAF data for each initial datum. Each enhanced datum indicating a degree of correlation between the filtered reference signal and the filtered input signal for a corresponding time delay and a corresponding frequency shift. The method further comprises identifying pairings of time delay and frequency shift in the enhanced data where the degree of correlation is greater than the degree of correlation in the initial data for the same pairings of time delay and frequency shift by more than a threshold.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS

Figure 1A:
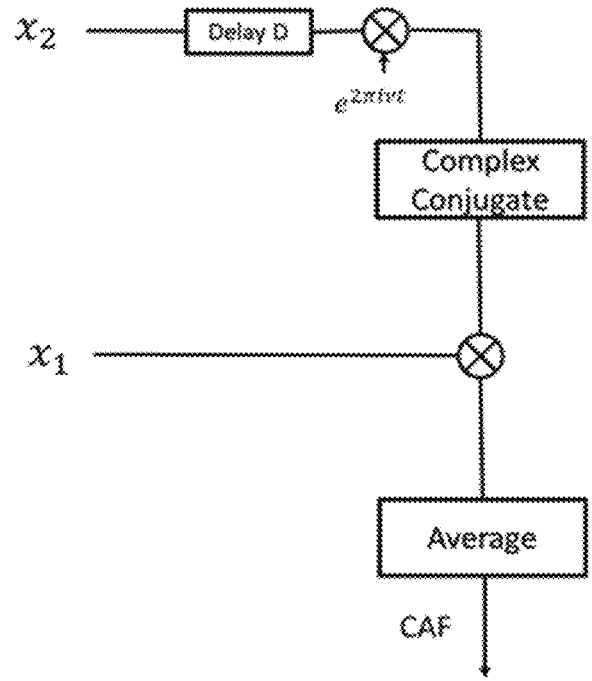
FIG. 1A is a block diagram of a prior art signal processing method.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Implicit and explicit reference is made throughout to electromagnetic signals in the radio and microwave frequency ranges and related apparatus, which are used as relevant examples to aid understanding of the invention. It should be appreciated that the present invention made be applied to reception, detection, and processing of any signal having wavelike properties. Examples include acoustic waves, light waves, and the like. Nothing in the present application is intended to limit the invention to radio waves or microwaves.

Various figures and the accompanying description may implicitly or explicitly refer to digital and discrete-time signal processing techniques, as non-limiting examples implementations of various embodiments. One skilled in the art will recognize, however, that embodiments may employ analog and continuous-time techniques as well.

Furthermore, the described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It should be understood that methods herein may be practiced using hardware components, software components, or any combination thereof.

Inventive embodiments are generally directed to methods that filter and coherently sum portions of a received signal of interest from an array of antenna inputs, where the received inputs are time delayed and frequency shifted. In certain embodiments, advantage is taken of the assumed cyclostationarity of the signal of interest to further detect and isolate it.

Consider a signal, x(t), exhibiting cyclostationarity. For a cyclostationary signal, the time delayed product waveform, x(t)x*(t+D), contains peaks in its spectrum, for some values of the time delay, D, and cyclostationary frequency, alpha. This spectrum is given by Eq. (1):

$$R_{xx}^{\alpha}(D) = \frac{1}{T}\int_0^T x(t)x^*(t+D)e^{-2\pi j\alpha t}dt.$$

Eq. (1) is otherwise known as the cyclic autocorrelation function, which is often abbreviated as "CAF", but herein will be abbreviated as "CyCAF" to distinguish it from the cross ambiguity function. For digitally modulated signals, peaks in the CyCAF occur when the cycle frequency α is equal to the digital symbol rate or its harmonics.

However, there is an alternative interpretation of this equation. For ergodic signals, as T approaches infinity, the integral in Eq. (1) becomes an expectation value. This implies that the signal correlates with a frequency-shifted, time delayed version of itself. Thus, the signal contains redundant information distributed across its spectrum at integer multiples of the symbol rate. Frequency Shift filtering (FRESH filtering, also called Cyclic Wiener filtering) exploits this redundant information to recover data that has been corrupted by interference. For reference, see: Gardner, W. A., "Cyclic Wiener Filtering: Theory and Method", IEEE Transactions on Communications, Vol. 41, No. 1, January 1993.

A similar interpretation applies to the Cross-Ambiguity Function ("CAF"), given below, where x1 and x2 are the signals received at a first antenna and a second antenna, respectively. For convenience, in the equation below, the standard CAF expression is multiplied by a factor of 1/T while continuing to use the term CAF. This CAF is given by Eq. (2):

$$R_{x_1 x_2}^{v}(D) = \frac{1}{T}\int_0^T x_2(t)x_1(t+D)e^{-2\pi jvt}dt.$$

For moving emitters or moving antennas, this function peaks when v is the frequency-difference-of-arrival (FDOA) between the two antennas and D is the time difference of arrival (TDOA). Eq. (2) implies that x2 correlates with a time-delayed, frequency-shifted version of x1. Hereafter, correlations such as Eq. (1) and Eq. (2) will be referred to as Delay Shift Correlations (DSCs).

Embodiments disclosed herein improve upon conventional filtering methods by exploiting features of such DSCs and a priori knowledge of cyclostationary properties of the signal(s) of interest. In applications of certain embodiments, characteristics of signals of interest are known beforehand, and the inventive techniques are used to filter noise from unknown interferers from the signal of known characteristics. In other applications, the signals are not known beforehand but are instead discovered and then isolated (thereby detecting previously unknown signals) using inventive methods disclosed herein.

Figure 1B:
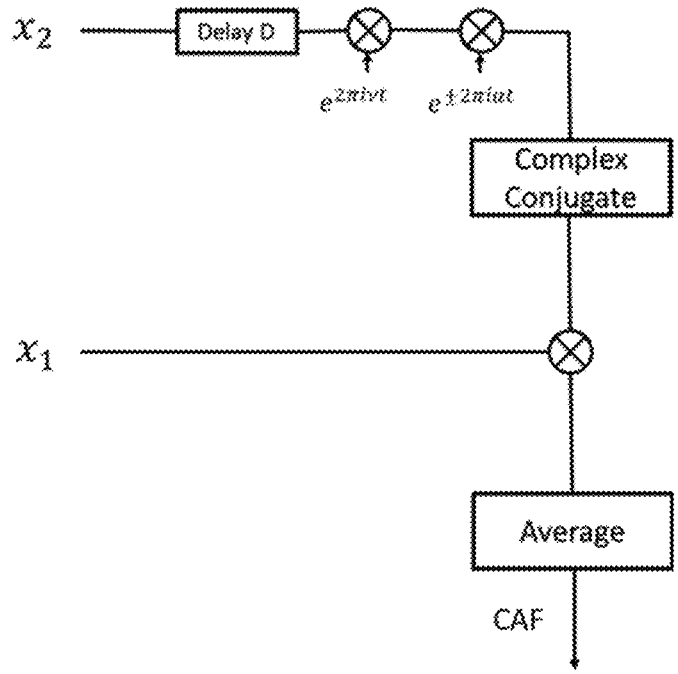
FIG. 1B is a block diagram of a variant of the prior art signal processing method of FIG. 1A

FIGS. 1A and 1B illustrate a conventional CAF and CyCAF, respectively. Two signals $x_1$ and $x_2$ are provided, representing the signals received at two different antennas. A time-delay (by $\Delta t=D$) and frequency-shift (by $\Delta f=v_1$) is applied to one of the received signals $x_2$, the resulting signal's complex conjugate is computed and it is multiplied with the un-shifted, un-delayed signal (x1), and the result is averaged over time, producing a cross-correlation. FIG. 1B schematically illustrates the computation of a cyclic cross ambiguity function, with is similar to the computation described above with respect to FIG. 1A, with the addition of another frequency shift term including alpha, the assumed cyclostationary cycle frequency.

Figure 1C:
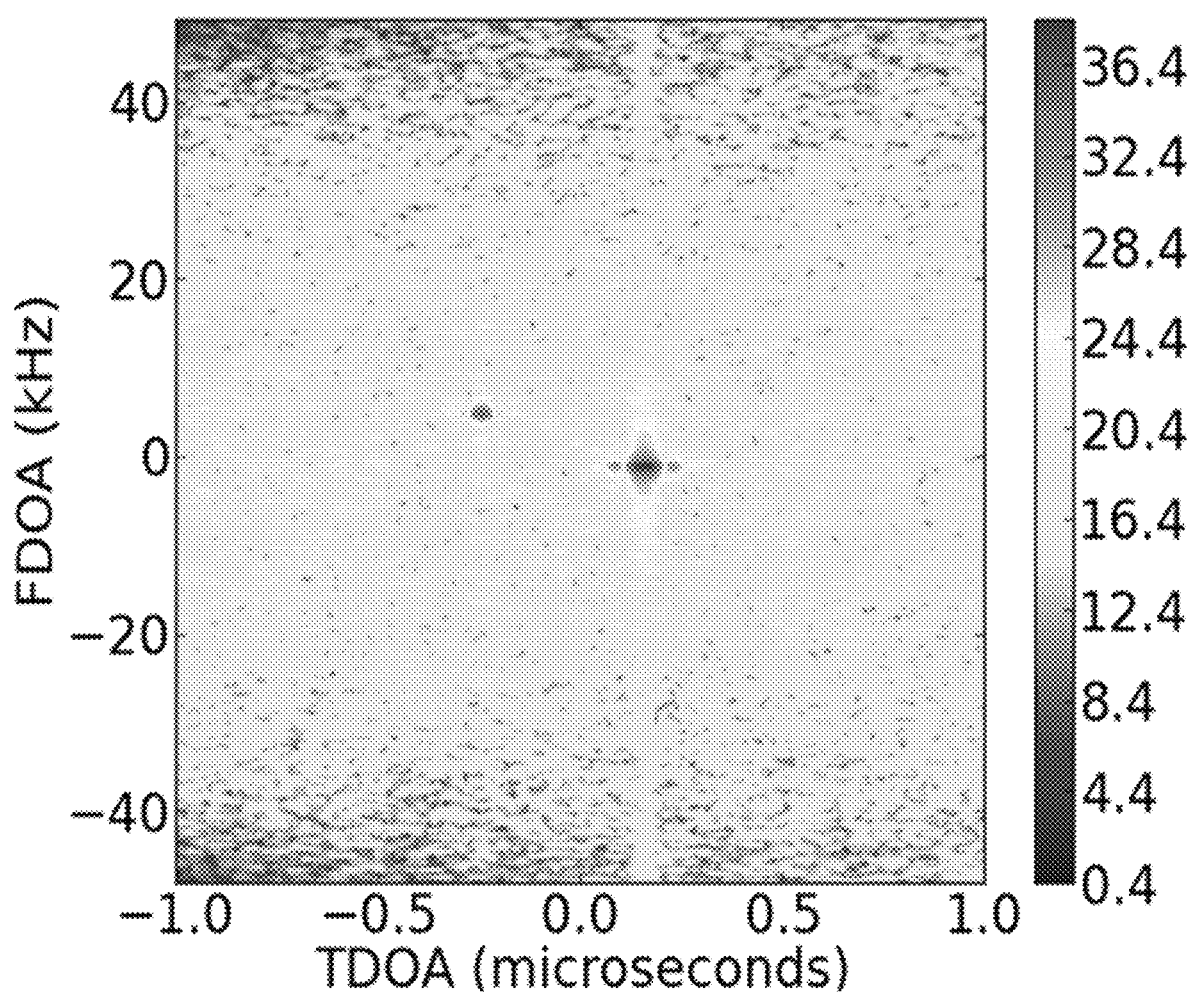
FIG. 1C is a graph of an example output using the prior art method of FIG. 1A or 1B.

By taking repeated samples according to the computational method of FIG. 1A (or FIG. 1B), where delay D and frequency shift $v_1$ are varied, a two-dimensional map of CAF output values is produced. In the case of the CyCAF, a two-dimensional map of values would be produced for each choice of cycle frequency. FIG. 1C shows a heat map of the values of an exemplary cross-ambiguity function of $(x_1, x_2)$ for delays of ±1 µs and frequency shifts of ±40 kHz. In the example of FIG. 1C, there are two distinct signals originating from two different locations having different Doppler frequency shifts and relative delay values, which are shown on the heat map. It should be appreciated that two antennas can be used to measure the distance and speed of a signal source relative to the antennas. Adding additional antennas (i.e., at least three) allows a signal to be localized in three-dimensional space on a closed surface such as the earth.

As illustrated by FIGS. 1A, 1B and 1C, the CAF can be used as a signal detection mechanism. In theory, computing the CAF can reveal the presence of a signal in TDOA/FDOA space, and then TDOA/FDOA filters may be applied to isolate the detected signal peak. However, in practice, this detection method is limited by the noise and interference in the antennas. The noise and interference produces unwanted correlations in regions of the CAF where there are no actual signals. This is called the "noise floor." The correlations due to thermal noise that cause the noise floor approach zero as the number of samples, or equivalently the integration time, used in the calculation increases toward infinity. However, in practical applications, this duration of sampling is impossible, and as a result, the noise floor often makes it difficult or impossible to detect weak signals. Interfering signals also contribute to the floor of the CAF, and they do not necessarily tend toward zero as the number of correlations increase toward infinity. When the noise/interference floor is high, it buries the signal of interest, making it undetectable. This method also fails when the spectral characteristics of the signal(s) vary unpredictably over time, since a given FDOA filter in the CAF space will only be useful for a signal having relatively stable spectral characteristics.

Figure 2A:
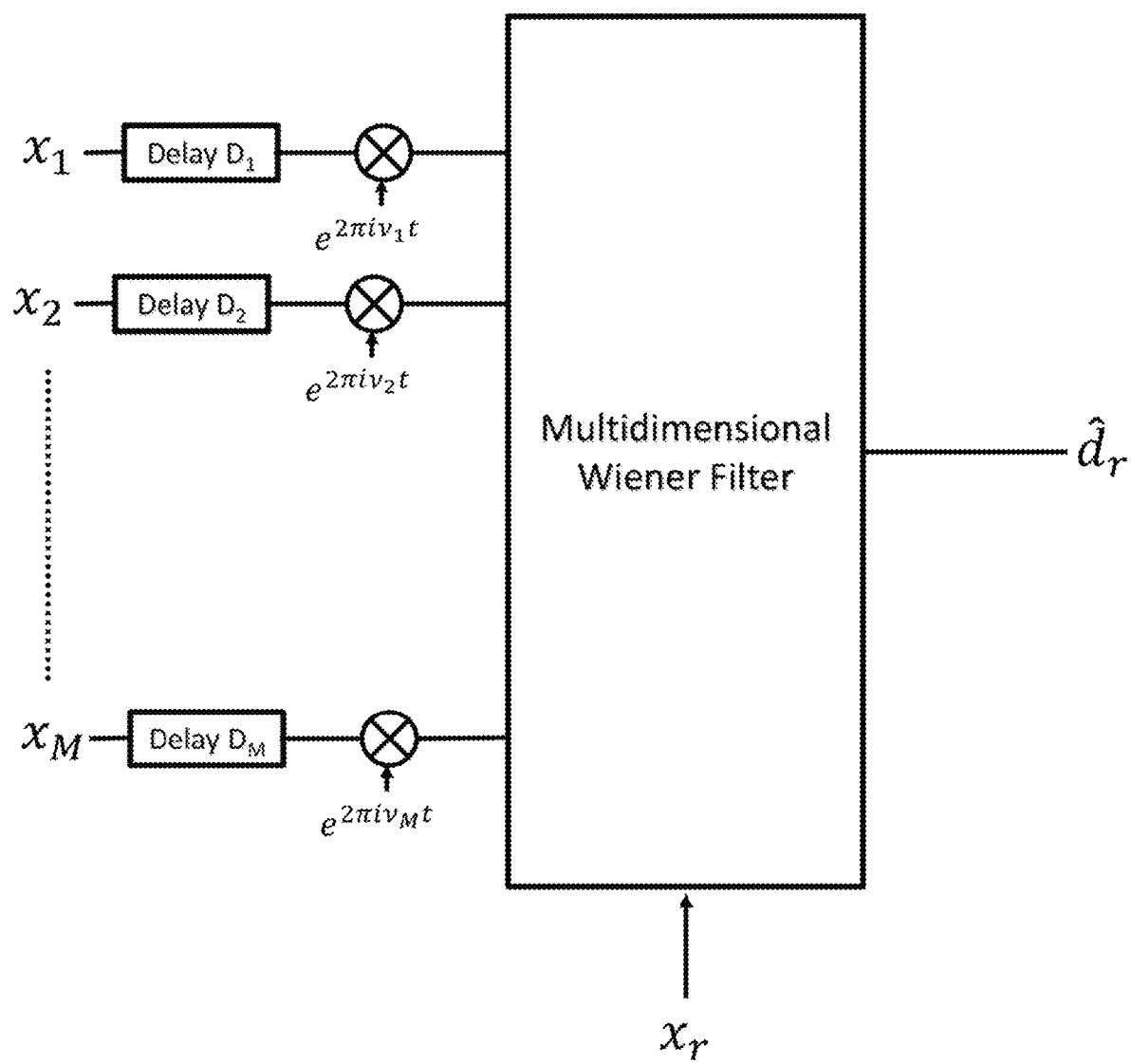
FIG. 2A is a block diagram of an example embodiment of methods disclosed herein.

FIG. 2A shows a block-level schematic of an example embodiment, referred to herein as an MFRESH (Multi-antenna Frequency Shift) filter. In this example, there are M+1 antennas producing M+1 inputs to the filter. One antenna signal is chosen as a reference signal and is denoted by $x_r$. In alternative embodiments, reference signal $x_r$ is a generated signal, i.e, an artificial signal, configured to share some characteristics with the signal of interest. The remaining antenna inputs are denoted by $(x_1 \ldots x_M)$. Relative time delays $(D_1 \ldots D_M)$ are respectively applied to signals $(x_1 \ldots x_M)$. Similarly frequency delays $(v_1 \ldots v_M)$ are respectively applied to signals $(x_1 \ldots x_M)$. The time delays and frequency delays are known beforehand, either because they are associated with an already-known signal, or because they are associated with a previously detected signal located in FDOA/TDOA space. For example, an initial set of time and frequency delays can be applied to input branches on the basis of detecting signal peaks in FDOA/TDOA space according to the methods set forth above with respect to FIGS. 1A and 1C. The M antenna signal branches form the input to a multidimensional Wiener filter Gardner, W. A., "Cyclic Wiener Filtering: Theory and Method", IEEE Transactions on Communications, Vol. 41, No. 1, January 1993., producing a filtered signal $d_r$. Filtered signal $d_r$ represents a signal located having a predetermined set of TDOA/FDOA values (at the input branches), which is similar to reference signal $x_r$, where the types of similarity are discussed below in reference to generating an artificial reference signal. Applicants have discovered that merely by combining time delayed and frequency shifted inputs in the manner of FIG. 2A while applying Wiener filtering as a function of $x_r$, even where $x_r$ is an unfiltered antenna input, signals located at a given point in TDOA/FDOA space can be isolated from the noise floor. It should be understood that the multidimensional Wiener filter shown may be replaced in alternate embodiments by other suitable methods for generating optimal multidimensional filter coefficients.

Figure 2B:
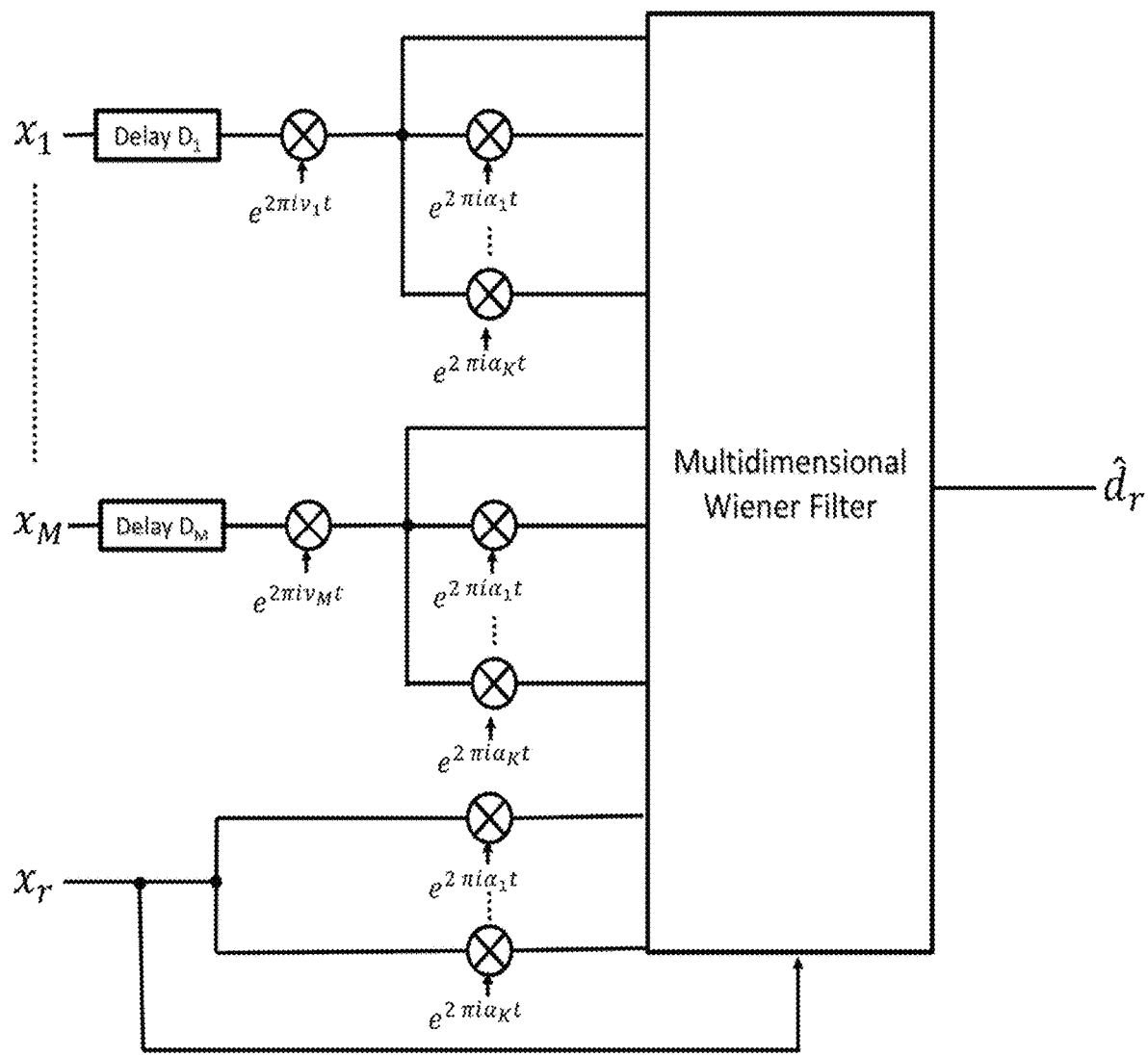
FIG. 2B is a block diagram of an alternate embodiment of the embodiment of FIG. 2A.

FIG. 2B shows an alternate embodiment, similar to the embodiment of FIG. 2A. However, the embodiment of FIG. 2B takes advantage of a cyclostationary reference signal. Here, it is assumed that the signal of interest has one of a number of possible cyclostationary cycle frequencies $(\alpha_1 \ldots \alpha_K)$. In the pictured embodiment, in addition to the time delays and frequency shifts shown in FIG. 2A, a series of additional frequency shifts corresponding to possible cycle frequencies of the signal, $(\alpha_1 \ldots \alpha_K)$ are applied to the antenna inputs. These M×K branches form the input to the multidimensional Wiener filter. The reference signal $x_r$ has applied the same possible cycle frequency terms $(\alpha_1 \ldots \alpha_K)$, and these frequency shifts may be both positive and negative. For many signals, but not all, the positive and negative cyclo-spectrum content is symmetric; it is an engineering exercise to determine the number of cyclo-spectral components and the polarity of each which will produce the best signal processing effect for a given signal of interest and relevant noise and interference conditions. In the case of FIG. 2B, an arrangement is provided that filters for a signal having a predetermined TDOA/FDOA and one of a number of predetermined cyclostationary cycle frequencies, where filtered signal $d_r$ represents an attempt to isolate a signal arriving at the antenna array having a predetermined TDOA, FDOA and cyclostationary cycle frequency. It will be appreciated that the schematic filter embodiments of FIGS. 2A and 2B essentially provide a setup for scanning for a signal in a multivariable space, where the variables are TDOA and FDOA, in the case of FIG. 2A, and those parameters plus cyclostationary cycle frequency in the case of FIG. 2B. Additionally, it should be understood that the arrangements of FIGS. 2A and 2B show an iterative optimization process of the filter coefficients in the multidimensional Wiener filter whereby the time delay, frequency shift and (optionally) the cycle frequency terms are varied, and the filtered signal is checked for increasing or decreasing amplitude until an optimized signal output emerges. The underlying mathematical concepts will be explained in detail below.

In addition to using one antenna signal as the reference signal, the reference signal may be supplied from other sources. As a non-limiting example, a previously-received signal known to be similar to an expected SOI may be used as a reference. In some embodiments, the reference signal may be simulated by synthesizing a signal sharing characteristics with an expected SOI. As a non-limiting example, a modulation modality and representative data may be chosen. Then, various parameters corresponding to that modality may be adjusted to achieve a desired signal. Non-limiting examples of such parameters include an amplitude modulation depth, a frequency modulation index, a phase modulation index, and so on, depending on the modulation modality. For a suspected signal of interesting using phase-shift-keying (PSK), a reference signal parameter may include the number of phase-shifts used to encode symbols and the values of those phase shifts. Certain modulation modalities include filtering as part of the signal generation process. For such modalities, the excess bandwidth or other features may be adjustable parameters. As an example, PSK and other modulation modalities may include the use of a root-raised cosine filter (RRC) during the signal generation process. Accordingly, when the reference signal is a simulated PSK-modulated signal, the excess bandwidth of an RRC filter may be chosen as an adjustable parameter.

Figure 2C:
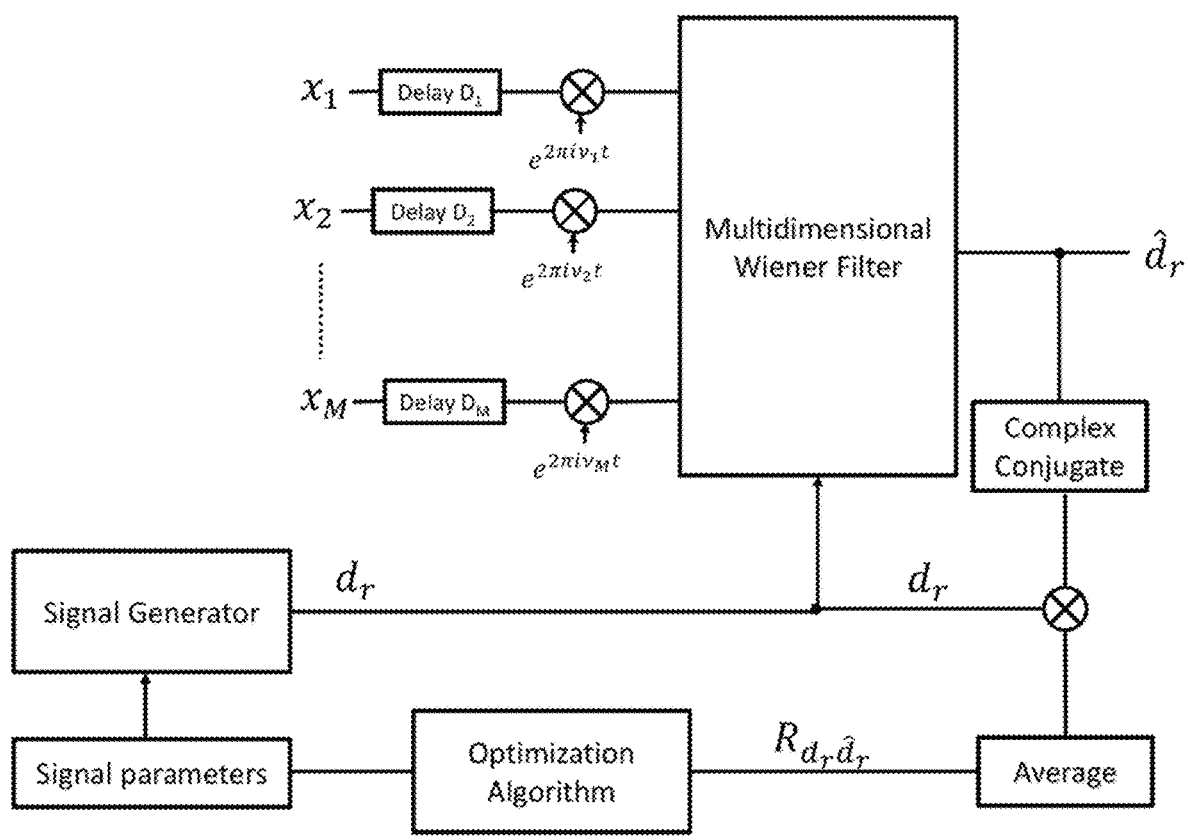
FIG. 2C is a block diagram of an application of an embodiment related to the embodiment shown in FIG. 2A, having additional features.

The person of ordinary skill will appreciate that the filtering setups of FIGS. 2A and 2B are useful for isolating signals originating at a predetermined point in FDOA/TDOA space, having shared characteristics with a reference signal. FIG. 2C schematically illustrates a more general filtering setup usable to detect parameter similarities between a reference signal and a signal of interest. In the embodiment of FIG. 2C, a multidimensional Wiener filter (MWF) receives as inputs a signal to be processed and a reference signal. The specific characteristics of the signal of interest may be unknown. The reference signal may start as virtually anything, but then is pre-processed to add some known characteristic, for example, a known amplitude modulation depth, a frequency modulation index, a phase modulation index, application of a root raised cosine filter having a particular bandwidth, etc. The output of the MWF is then cross-correlated directly with the input of the parameter-modified reference signal. The output of this process, integrated over time, represents a degree of similarity between the parameter-modified reference signal and the input signal. By varying the known parameter applied to the reference while monitoring the output of the cross correlation, the setup can be tuned to find similar characteristics located in the signal of interest. By choosing other parameters and repeating the process, a reasonable characterization of the signal of interest is obtained.

To understand how the DSCs identified above are useful in isolating signals of interest from interference, it is helpful to discuss coherence. Two signals are said to be coherent if they have a constant phase difference and the same center frequency. As a consequence, the cross-correlation function of coherent signals will be large, and they may be added together constructively with no cancellation using a fixed phase offset. If the phase difference varies randomly then the two signals are incoherent. As the integration time increases, the cross correlation between the two incoherent signals vanishes asymptotically. Thus, when incoherent signals are summed, the resulting amplitude is attenuated relative to coherent signal summation. Embodiments of the invention make use of this property to accomplish interference cancellation. This is accomplished by determining frequency shifts and delay parameters in the DSCs for which the signal of interest is coherent but the interferer is incoherent. In other words, embodiments of the invention select and apply combinations of time delays, frequency shifts, and antennas (received signals) that correlate preferentially with the desired signal source. As will be seen below, this process is iterative, and results in cancellation of interfering signals and amplification of signals of interest over time.

To provide an illustration, consider a signal received by the l-th antenna, denoted $x_l$ as given by Eq. (3), where s, y, and η refer to the desired signal, interferer, and noise, respectively:

$$x_l(t)=s_l(t)+y_l(t)+\eta_l(t).$$

With these definitions, the DSC, of which the CyCAF and the CAF are specific cases, can be written as given by Eq. (4), where k and l are labels corresponding to two receiving antennas:

$$R_{x_k x_l}^v(D) = \frac{1}{T}\int_0^T x_k(t)x_l(t+D)e^{-2\pi jvt}dt.$$

A reference signal, d, is provided that contains a known sequence of data contained in s. In certain embodiments, the reference signal is a training sequence, but in others, it is a blind approximation for the desired signal. The DSC between xk and the reference signal d is given by Eq. (5):

$$R_{x_k d}^v(D)=R_{s_k d}^v(D)+R_{y_k d}^v(D)+R_{\eta_k d}^v(D).$$

One expects that the noise, $\eta_k$, is uncorrelated with the reference signal (and will therefore integrate to zero in the DSC over time), and this should hold so long as d was not approximated using data from a receiving antenna, that is, the k-th antenna (i.e., v≠0). The method of certain inventive embodiments, then, selects values of D and v such that the reference signal will emerge from the autocorrelation and the interferers will be suppressed, as given by Eq. (6):

$$R_{s_k d}^v(D) \gg R_{y_k d}^v(D) \sim 0.$$

In certain embodiments, this relationship provides a rule for selecting a reference signal, and it also determines which frequency shifts may be used for the filter branches.

In some embodiments, the reference signal may be a set of previously-received signals or may be simulated based on known properties of the signal-of-interest. In other embodiments, one of the antenna signals may be used as a reference.

It is possible to build a proxy for an ideal reference signal by shifting a received signal by the first harmonic of the cycle frequency of the desired signal, α'. This may done when the α'-shifted received signal has a small correlation with the cyclic harmonics of the interferer. This is advantageous when there is a single antenna, but it comes with a SNR cost of about 9 decibels in most practical cases. This happens because the amplitude of correlations is lower for peaks due to cyclostationarity; these are correlations between the spectral skirts of the signals, and the correlation is attenuated by the roll-off of the pulse shape.

In certain embodiments disclosed herein using multiple antennas with TDOAs and FDOAs between them, the received signal is chosen from a single reference antenna, labeled as r. Under this condition, one has, as given by Eq. (7):

$$d(t)=s_r(t)+y_r(t)+\eta_r(t).$$

For Eq. (7) to be valid, each branch of the filter using antenna k, frequency shift v, and time delay D should satisfy the condition as given by Eq. (8):

$$R_{y_k y_r}^v(D) \sim 0.$$

In other words, input branches are chosen so that they do not correlate with the interferer's contamination of the 'reference antenna.'

An exemplary method for defining the branches of the Multi-dimensional Weiner Filter of FIG. 2 will now be discussed.

If there are L input branches in the filter, one may write the output of the filter at time index n as given by Eq. (9):

$$\hat{d}(n) = w^\dagger(n)x(n) = \sum_{l=1}^{L} w_l^\dagger(n)x_l(n).$$

where † denotes the conjugate transpose, l labels the input branch, and w and x are concatenations of the branches as given by Eq. (10):

$$w(n) = \begin{bmatrix} w_1(n) \\ w_2(n) \\ \vdots \\ w_L(n) \end{bmatrix}, x(n) = \begin{bmatrix} x_1(n) \\ x_2(n) \\ \vdots \\ x_L(n) \end{bmatrix}.$$

In the equation above the l-th branch contains filter coefficients and a windowed input vector, given respectively by Eq. (11) and Eq. (12) below:

$$w_l(n) = \begin{bmatrix} w_l\left(n - \frac{M-1}{2}\right) \\ w_l\left(n - \frac{M-1}{2} + 1\right) \\ \vdots \\ w_l\left(\frac{M-1}{2} + n\right) \end{bmatrix}, x_l(n) = \begin{bmatrix} x_l\left(n - \frac{M-1}{2}\right) \\ x_l\left(n - \frac{M-1}{2} + 1\right) \\ \vdots \\ x_l\left(\frac{M-1}{2} + n\right) \end{bmatrix}.$$

where M is the length of the filter for each branch. In preferred embodiments, it is advantageous that the filter have an odd number of taps, ensuring that the filtering does not introduce an undesirable time delay at the output.

To define the input branches, the TDOA between the desired signal in the k-th antenna and the reference signal is defined as $D_k$. Likewise, the FDOA between the k-th antenna and the reference signal is defined as $v_k$. Accordingly, the l-th branch at time t is specified as given in Eq. (13):

$$x_l(t) = x_k(t - D_k)e^{2\pi j(v_k + \alpha_l)t} dt$$

where $\alpha_l$ is an additional frequency shift chosen to take advantage of correlations due to cyclostationarity.

As an example consider the case of blind filtering with two antennas. One may label the signals from the first antenna and the reference antenna as $x_1$ and $x_2$, respectively. Suppose that the desired signal contains cycle frequencies $\alpha_s = \pm nr_s$ for $n = \{0, 1, 2, \ldots\}$, where '$r_s$' is the symbol rate. One may choose at $\alpha_l \in \{0, -r_s, r_s\}$, leading to a set of branches that exploits TDOA, FDOA, and cyclostationarity as given by Eq. (14):

$$x_l(t) \in \begin{Bmatrix} x_1(t)(t - D_1)e^{2\pi j v_1 t}, \\ x_1(t)(t - D_1)e^{2\pi j(v_1 + r_s)t} \\ x_1(t)(t - D_1)e^{2\pi j(v_1 - r_s)t} \\ x_2(t)e^{-2\pi j r_s t} \\ x_2(t)e^{2\pi j r_s t} \\ x_1^*(t)(t - D_1)e^{2\pi j v_1 t} \\ x_1^*(t)(t - D_1)e^{-2\pi j(v_1 + r_s)t} \\ x_1^*(t)(t - D_1)e^{-2\pi j(v_1 - r_s)t} \\ x_2^*(t)e^{-2\pi j r_s t} \\ x_2^*(t)e^{2\pi j r_s t} \end{Bmatrix}.$$

Each branch above should satisfy Eq. (8) if an interferer is present. Additionally, the branches using the reference signal, $x_2$, may be included if the interferer has no DSC peaks at $\pm r_s$. The last five branches, the conjugate branches, are only relevant for some modulation types, such as complex Amplitude Modulation and Binary Phase Shift Keying. In certain embodiments these should be omitted if one knows a priori that the optimal filter coefficients are zero. It should be appreciated that for certain other complex signals, more than one fundamental cycle frequency and accompanying set of harmonics may be present. Thus, certain embodiments may implement filter branches corresponding to more than one cycle frequency and harmonics of the additional cycle frequencies.

If one chooses a set of frequency shifts and uses a known reference signal, d, one may write the error at time index, n, as given by Eq. (15):

$$\in(n) = d(n) - w^\dagger(n)x(n).$$

The optimal filter coefficients which minimize the Mean Square Error (MSE) are given by Eq. (16)

$$w_0 = R^{-1}p.$$

The time-averaged autocorrelation is given by Eq. (17) where angled brackets denote a time average:

$$R = \langle E\{x(n)x^\dagger(n)\}\rangle.$$

The time averaged cross-correlation is given by Eq. (18):

$$p = \langle E\{x(n)d^*(n)\}\rangle.$$

Of course, one should only expect optimality if the TDOA, FDOA, and cycle frequencies are known exactly. In practice these must be estimated. Below is disclosed an adaptive filtering method which is capable of simultaneously minimizing the MSE and refining TDOA and FDOA estimates.

Thus far has been disclosed a method for how to select a reference signal for blind filtering. We now describe how the filter equations are affected by the choice of the reference signal, which description is used as guidance on reference signal selection criteria.

As before, the reference signal is designated as a received signal from a single reference antenna, labeled as r. Because it is a measured signal, this reference is contaminated by noise and interference as given by Eq. (19):

$$d(t) = s_r(t) + y_r(t) + \eta_r(t).$$

With this choice, the time averaged cross-correlation splits up into three terms given by Eq. (20):

$$p = \langle E\{x(n)s^*_r(n)\}\rangle + \langle E\{x(n)y^*_r(n)\}\rangle + \langle E\{x(n)\eta^*_r(n)\}\rangle.$$

In this signal model the first term is the cross correlation for an ideal reference; good performance requires that the second and third terms be suppressed.

The second term is the cross-correlation between the input branches and the interferer (as measured by the reference antenna). For input branches comprised of a cycle frequency shift of the reference signal, this term will approximately vanish as long as the signal of interest has no cycle frequency harmonics in common with the interferer. For branches that use a TDOA and FDOA shift, this term will vanish if the TDOA or FDOA of the interferer is well-separated from the signal of interest. In other words, if one plots the Cross Ambiguity Function as a function of TDOA and FDOA, the peaks associated with the signal of interest should not overlap with the peaks due to the interferer under these conditions. For branches which use TDOA, FDOA, and cycle frequency, one should consider the DSC between each input branch and the interferer. If the two signals are well-separated in TDOA then the DSC between the input branch and the interferer will vanish along with the second term in Eq. (20). If this is not the case, then there should not be any appreciable correlations along the frequency-shift domain.

The third term in Eq. (20) is the cross correlation between the input branches and the noise in the reference antenna. For white Gaussian noise this term will vanish for all input branches provided that there is sufficient integration time. It is advantageous in this respect to not select the reference signal as an input branch.

Figure 3A:
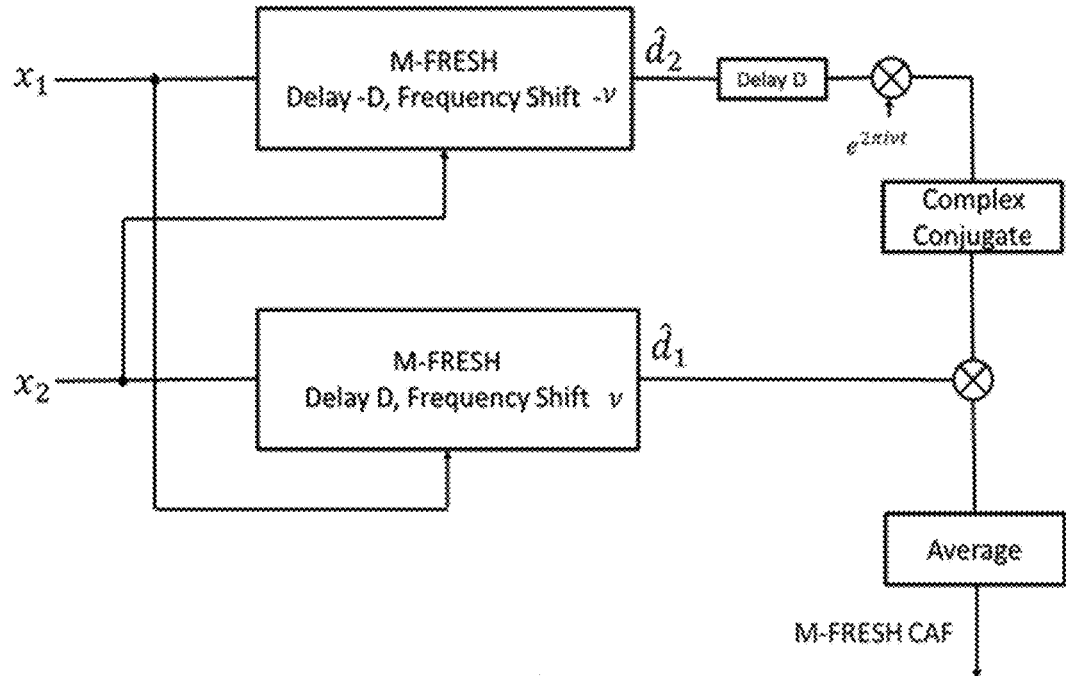
FIG. 3A is a block diagram of an application of the embodiment shown in FIG. 2A.
Figure 3B:
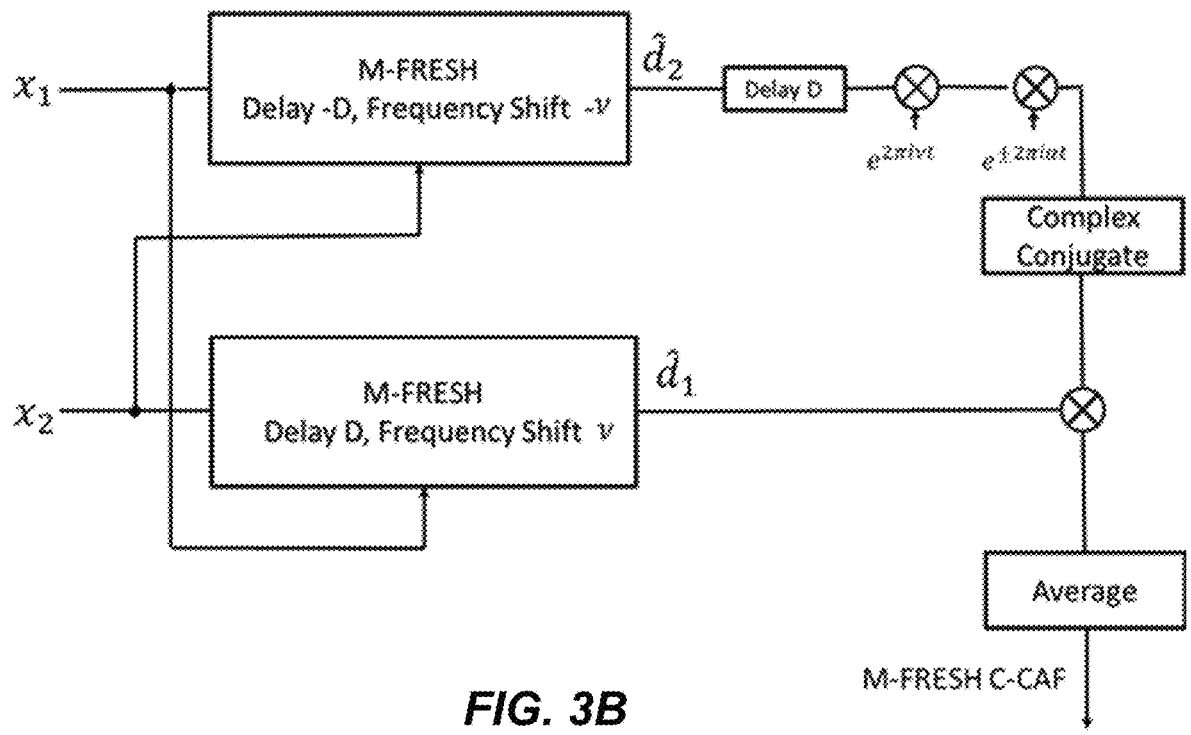
FIG. 3B is a block diagram of an application of the embodiment shown in FIG. 2B.

It should be appreciated that MFRESH filtering using embodiments such as those described in connection to FIGS. 2A and 2B can be used to improve existing signal processing techniques. FIG. 3A is a block-level schematic of an improved cross-ambiguity function, referred to herein as an "MFRESH CAF Enhancement" making use of improved embodiments disclosed herein such as the embodiment described above in connection to FIG. 2A. These improved embodiments are used to reduce the noise and interference floor of a CAF by replacing the antenna signal inputs to the CAF as shown in FIG. 2A with MFRESH-filtered antenna signals. FIG. 3B is a block-level schematic of an improved cyclic cross-ambiguity function (see FIG. 1B and accompanying description), referred to herein as an "MFRESH Cyclic CAF Enhancement", making use of improved embodiments disclosed herein such as the embodiment described above in connection to FIG. 2B.

The operation of two possible MFRESH-enhanced CAF calculations will now be discussed with reference to two example scenarios. For simplicity, the examples include only two antennas, although the principles may be generalized to arrays of many antennas as will be evident from the entirety of this disclosure. In a first example, MFRESH filtering is used to remove a strong signal localized relative to two or more antennas by applying MFRESH filtering using the known time delay and frequency-shift of the strong signal between the two antennas. In this instance, MFRESH filtering produces an optimal estimate of the strong signal, which can then be subtracted from the antenna signals (with the appropriate time delay and frequency shift applied between the two input signals). The antenna signals (after subtraction of the strong signal) are then used as inputs to a conventional CAF. This has the effect of significantly reducing the noise floor, making signals in the vicinity of the strong signal source more readily detectable.

In the second example represented by FIGS. 3A and 3B, repeated MFRESH filtering over a range of TDOA/FDOA pairs is used to locate potential signal sources where no discernible signals above the noise floor were previously detectable. Suppose that a user chooses TDOA and FDOA value where there is no detectable signal and generates an MFRESH filter: theoretically, the optimal coefficients for the filter will tend toward zero and the signal estimate output will also tend toward zero. In other words, the CAF after applying this filter will theoretically have a noise floor equal to zero for that choice of TDOA/FDOA. In practice using MFRESH CAF produces suppression of the noise/interference floor over a normal CAF. This makes it possible to locate previously undetectable signals. An example procedure is as follows:

For a particular point in a chosen range of TDOA-FDOA space, an MFRESH filter is generated and applied to the antenna signals using the corresponding TDOA and FDOA. That is, each input signal to the CAF is MFRESH-filtered using the other signal as a reference. Then the CAF is recalculated using the filtered signals. The difference between the ordinary CAF and the MFRESH-enhanced CAF is recorded at each point may be referred to as the "MFRESH enhancement signal". This process is repeated for every point in the chosen range of TDOA-FDOA space and the measurements are assembled into a map much like the CAF heatmap shown in FIG. 1C. Points where the MFRESH enhancement signal is significantly larger than a chosen metric (e.g., the mean or median MFRESH enhancement signal for the entire measured range) may be identified as likely sources of previously-undetected signals of interest.

As shown in FIGS. 3A and 3B, MFRESH filtering is applied to both antenna signal branches. The $x_1$ input into the CAF with MFRESH filtered signal produced from the antenna signal $x_1$ using the antenna signal $x_2$ as the reference signal. Similarly, the $x_2$ input into the CAF with MFRESH filtered signal produced from the antenna signal $x_2$ using the antenna signal $x_1$ as the reference signal. Because the frequency shift and time delay of $x_1$ relative to $x_2$ have opposite signs as the frequency shift and time delay of $x_2$ relative to $x_1$, the frequency shifts and time delays of the two MFRESH filter blocks in FIG. 3A have opposite signs.

These improvements can also be applied to a cyclic CAF used with cyclostationary signals, as shown in FIG. 3B. In such instances, the initial CAF has an additional variable: the cycle frequency of the cyclostationary signal. The signals are appropriately shifted by an additional frequency shift corresponding to that cycle frequency. Note that the signal may be shifted up in frequency or down, and that either choice may be used to implement a cyclic CAF.

Additional features of certain embodiments will now be described. It should be understood that an optimal MFRESH filter may provide good performance at one moment in time, but that its performance may not be consistent if, for example, the surrounding environment changes or the signals change. For instance, the distribution of interference sources may change, or a moving signal source may change its speed, direction, or both. In addition, performance may be subject to improvement if the time delays, frequency shifts, and cycle frequencies are not known with sufficient accuracy.

Figure 4A:
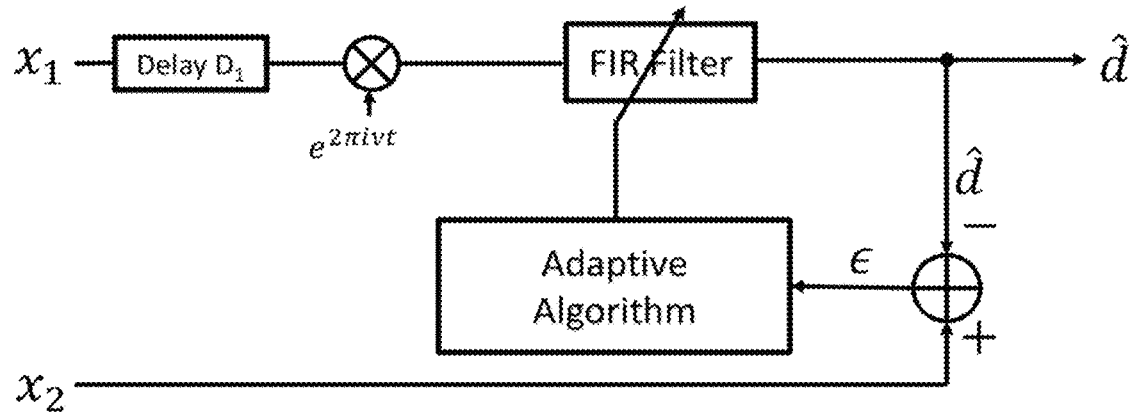
FIGS. 4A-B are block diagrams of additional example embodiments of methods disclosed herein showing additional features.
Figure 4B:
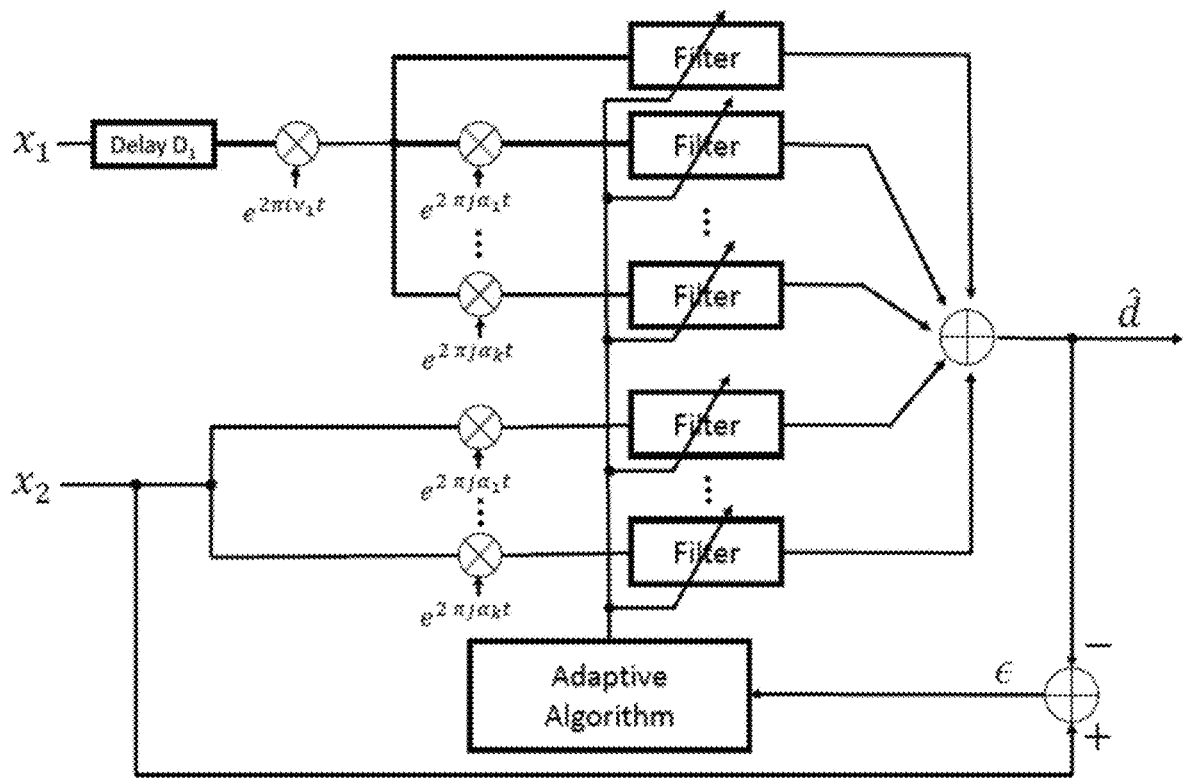

Certain embodiments replace the multidimensional Wiener filter depicted in FIGS. 2A/B and discussed in connection with FIG. 3A/B, with an adaptive algorithm. FIGS. 4A and 4B shows simplified example embodiments implementing such an adaptive algorithm. For simplicity, only two signals, $x_1$ and $x_2$ are shown ($x_2$ is the reference signal). FIG. 4A is an example which excludes cycle frequency as in input, while FIG. 4B is a more general example applicable to cyclostationary signals as well. In FIG. 4A, the filter shown is as a finite impulse response filter (FIR), as a non-limiting example. This adaptive algorithm, similar to the multidimensional Wiener filter, is usable to identify an optimal set of filter coefficients for the given input signals and input parameters. However, the adaptive algorithm uses the input parameters (the time delays, frequency shifts, and cycle frequencies) as initial approximations and varies these inputs in search of a better set of filter coefficients. In order to do so, the adaptive component measures the error E between the filter output d and the reference signal and adjusts the input parameters to yield a resulting filter that reduces (and soon minimizes) the error. It should be appreciated that many known methods to adjust the inputs many be suitable, including known techniques such as Newton's method or gradient descent.

In one embodiment, a Least Mean Squares (LMS) algorithm used to compensate for cycle frequency errors. Certain embodiments improve on conventional LMS by explicitly solving for the FDOA and cycle frequency corrections as part of the LMS update. In the discussion that follows below, the filter coefficient search step size is denoted by the parameter, $\mu$, and the frequency shift step size is denoted by the parameter, $\lambda$.

The standard LMS update for the filter coefficients is given by Eq. (21):

$$w(n+1)=w(n)+2\mu \in^*(n)x(n)$$

$$\in(n)=d(n)-\hat{d}(n)$$

$$\hat{d}(n)=w^\dagger(n)x(n).$$

However, if there are cycle frequency errors the filtering coefficients will evolve by a phase over time. The phase estimate at time n as given by Eq. (22)

$$\Phi(n) = \begin{bmatrix} e^{-2\pi j\Delta\theta_1(n)I_M} & 0 & \cdots & 0 \\ 0 & e^{-2\pi j\Delta\theta_2(n)I_M} & \cdots & 0 \\ \vdots & \vdots & \ddots & \vdots \\ 0 & 0 & \cdots & e^{-2\pi j\Delta\theta_L(n)I_M} \end{bmatrix}$$

where $\Delta\theta_l(n)$ is the phase correction due to frequency errors in the l-th branch, and $I_M$ is an M×M identity matrix. Thus, one may evolve an estimate for the filter at time n to time (n+1) by rotating the coefficients in the complex plane as given in Eq. (23)

$$w(n+1)=\Phi(n)w(n).$$

With this definition, the gradient of the squared error, $\xi(n)=|d(n)-\hat{d}(n)|^2$, with respect to the phase correction for the lth branch at time n is given by Eq. (24):

$$\frac{\partial \xi(n)}{\partial \Delta\theta_l(n-1)} = 4\pi \Im m\{\epsilon^*(n)\hat{d}_l(n)\}$$

where $\hat{d}_l(n)=e^{2\pi j\Delta\theta_l(n-1)}w_l^\dagger(n-1)x_l(n)$ is the filter output from the l-th branch, and $\Im m$ denotes the imaginary part.

As in the standard LMS algorithm, the gradient with respect to the filter coefficients is given by Eq. (25):

$$\frac{\partial \xi}{\partial w} = -2\epsilon^* x(n)$$

Phase Compensated LMS (PCLMS) is now introduced as the following set of update equations.

Step 1: Calculate signal and error estimates as given by Eq. (26):

$$\hat{d}(n)=w^\dagger(n)x(n)$$

$$\in(n)=d(n)-\hat{d}(n)$$

$$\hat{d}_l(n)=w_l^\dagger(n)x_l(n).$$

Step 2: Update parameter estimates for the current time according to Eq. (27):

$$\Delta\theta_l(n)=\Delta\theta_l(n-1)-4\pi\lambda \Im m\{\in^*(n)\hat{d}_k(n)\}$$

$$w'(n)=w(n)+2\mu\in^*(n)x(n).$$

Step 3: Predict filter coefficients for the next time step as given by Eq. (28):

$$w(n+1)=\Phi(n)w'(n).$$

There are two step size parameters in the PCLMS algorithm, $\mu$ and $\lambda$. These may be set to a constant value or one may use an adaptive step size algorithm such as Normalized Least Mean Squares (NLMS). Further details may be found in D. Bismor, K. Czyz, Z. Ogonowski, "Review and Comparison of Variable Step-Size LMS Algorithms." International Journal of Acoustics and Vibration, 21(1), 2016. As an example, certain embodiments use an adaptive moment algorithm called 'Adam' as described by D. P. Kingma and J. Ba, "Adam: A Method for Stochastic Optimization," 3rd International Conference for Learning Representations, San Diego, 2015.

In order to illustrate various advantages realized by embodiments disclosed herein, the results of performance simulations of the same are discussed below for two scenarios: Scenario I corresponds to filtering out a broadband interference source. Scenario II corresponds to filtering out a narrowband interference source. For each scenario the data received by two antennas is simulated. All signals use root-raised cosine pulse shaping, and each simulation is comprised of 300,000 samples at a sample rate of 10 MHz. Table 1 below lists the parameters of each simulated signal and Table 2 below describes the simulation for the received data for each antenna as well as the TDOA and FDOA values. We refer to the filtering approaches below as BAM-FRESH (Blind Adaptive Multi-Antenna Frequency Shift) filtering.

TABLE 1

|  |  | Modulation | $r_s$ (MHz) | $\beta$ | CF (MHz) |
|---|---|---|---|---|---|
| Scenario I | Signal | QPSK | 3.0 | 0.33 | 0.0 |
|  | Interferer | 16QAM | 5.0 | 0.25 | 0.5 |
| Scenario II | Signal | BPSK | 7.0 | 0.33 | 0.0 |
|  | Interferer | 8PSK | 1.2 | 0.25 | 0.4 |

TABLE 2

|  |  |  | Scenario I | Scenario II |
|---|---|---|---|---|
| Antenna 1 | Amplitudes | Signal | 1.0 | 1.0 |
|  |  | Interferer | 0.75 | 1.5 |
|  |  | Noise | 0.75 | 0.75 |
|  | SINR (dB) |  | −0.5 | −4.5 |
| Antenna 2 | Amplitudes | Signal | 1.0 | 1.0 |
|  |  | Interferer | 0.5 | 0.5 |
|  |  | Noise | 1.5 | 1.0 |
|  | SINR (dB) |  | −4.0 | −1.0 |

TABLE 2-continued

|  |  | Scenario I | Scenario II |
|---|---|---|---|
| TDOA (μs) | Signal | 1.5 | −0.4 |
|  | Interferer | −0.6 | 1.2 |
| FDOA (Hz) | Signal | −20.0 | 10.0 |
|  | Interferer | 30.0 | −20.0 |

Figure 5:
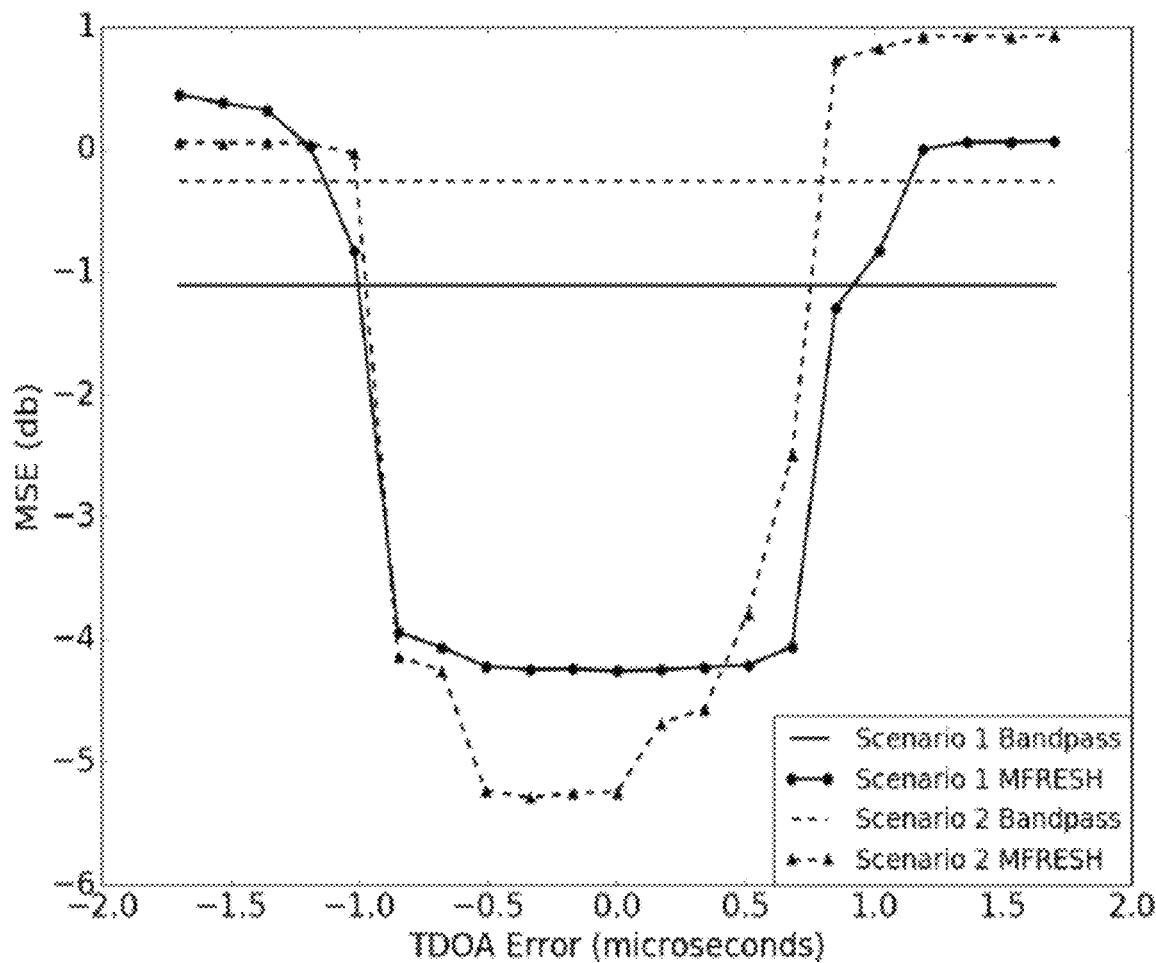
FIG. 5 is a graph comparing performance of elements of embodiments disclosed herein to prior art methods.

FIG. 5 shows the Mean Squared Error (MSE) of the filtered signal as a function of the error in TDOA estimates. At zero TDOA error, BAMFRESH filtering provides a 3-5 dB reduction in MSE compared to a conventional bandpass filter set to the bandwidth and center frequency of the signal-of-interest (SOI). It is worth reiterating here that the signal-to-interference-plus-noise ratio (SINR) is below 0 dB for all antennas in both scenarios.

As the accuracy of the TDOA estimate decreases, the BAMFRESH filter's performance degrades very little and then rapidly degrades. With 17 taps and a sample rate of 10 MHz, the filter spans a time window of 1.7 microseconds. When the error in TDOA is outside of this window, the filter is effectively targeting the wrong location in the CAF plane for blind filtering, i.e. it filters for noise instead of the SOI. For Scenario II, a TDOA error of 1.8 μs centers the filter at the TDOA of the interferer. Thus, the performance decreases as one approaches this limit. Furthermore, the interferer is narrow in this scenario implying that its peak in the CAF plane is broad in TDOA. This further increases the risk for undesirable correlations between the reference signal and the interferer. If one wishes to mitigate these effects then it may be wise to use fewer filter taps and more accurate TDOA estimation.

Figure 6A:
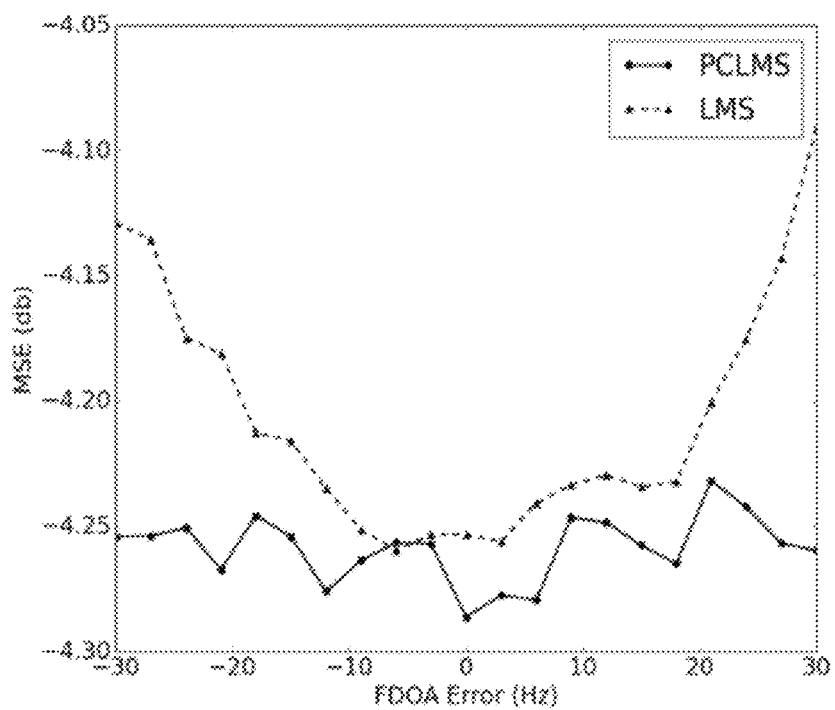
FIGS. 6A and 6B is a graph comparing performance of additional elements of embodiments disclosed herein to prior art methods.
Figure 6B:
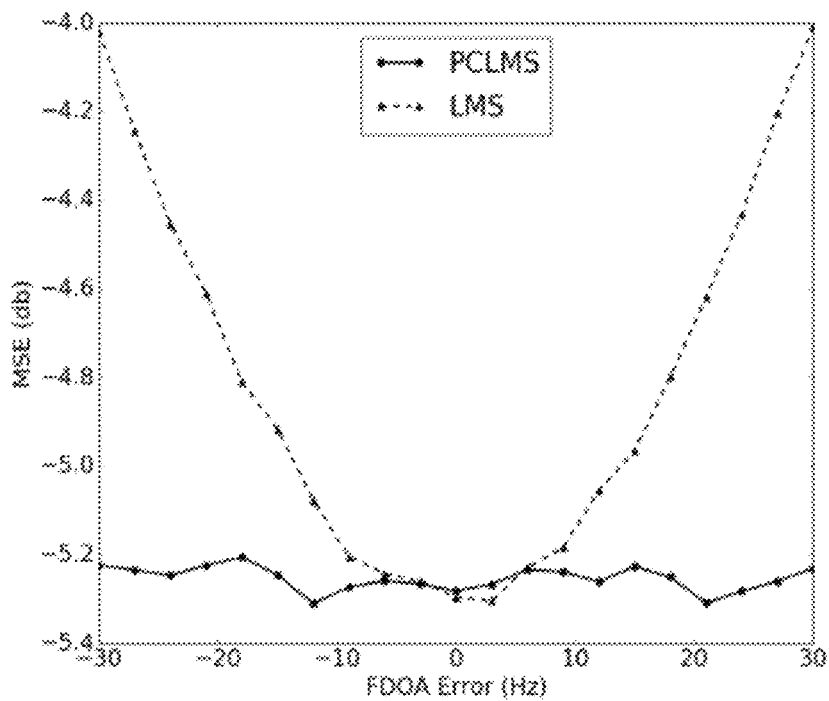

FIGS. 6A and 6B show the MSE for the BAMFRESH filter as a function of the error in the FDOA estimate, for Scenario 1 and Scenario 2, respectively. We also compare two different BAMFRESH adaptive approaches, LMS and PCLMS. In both algorithms we use Adam optimization with identical parameters. Both methods are robust to FDOA error; however, the PCLMS algorithm is able to adapt to errors as large as 30 Hz with no appreciable increase in MSE.

Figure 7A:
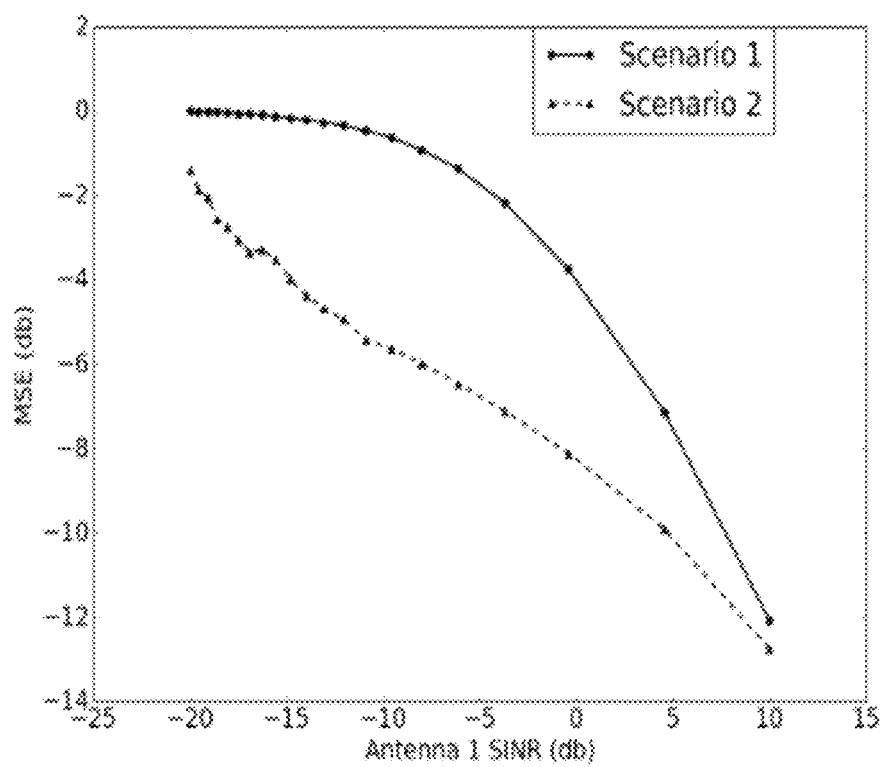
FIGS. 7A and 7B are graphs showing simulated performance of embodiments herein under two different scenarios.
Figure 7B:
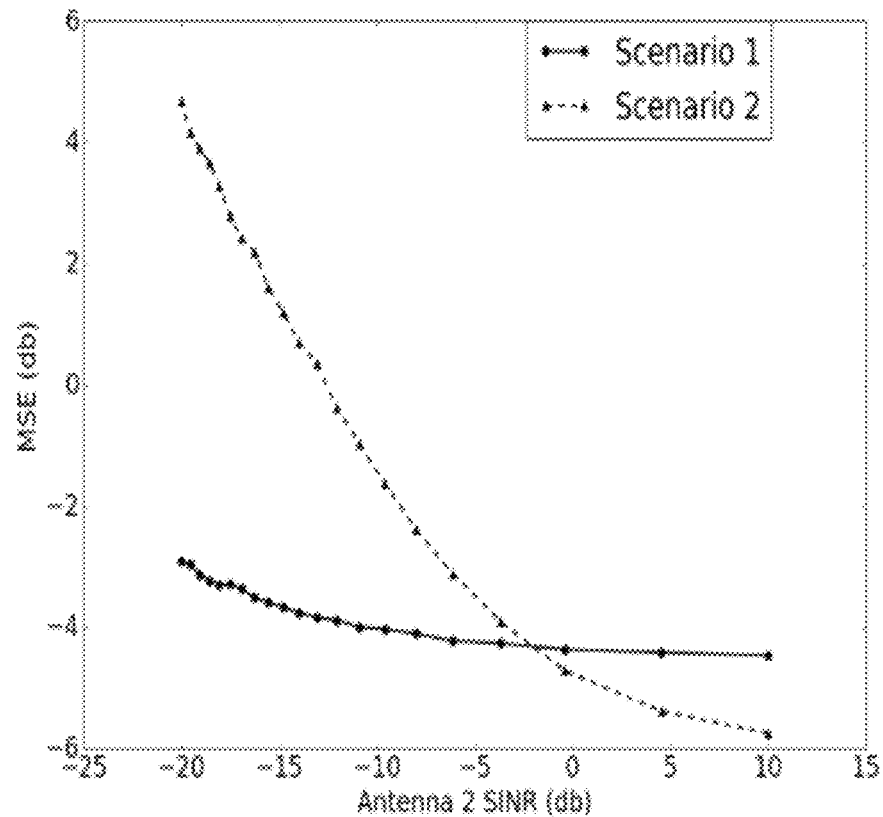

FIGS. 7A and 7B show the filter performance as a function of the SINR of antenna 1 and antenna 2, respectively. FIG. 7A shows Mean Squared Error (MSE) of the BAMFRESH filter as a function of the SINR of the input antenna 1 for Scenario I and Scenario II. Antenna 1 was not used as the reference signal. The SINR of antenna 2 was fixed at −4.0 dB for Scenario I and −1.0 dB for Scenario II. FIG. 7B shows Mean Squared Error (MSE) of the BAMFRESH filter as a function of the SINR of antenna 2 for Scenario I and Scenario II. Antenna 2 served as the reference signal. The SINR of antenna 1 was fixed at −0.5 dB for Scenario I and −4.5 dB for Scenario II.

For all data points in the graphs, the noise amplitude of the antenna was fixed at 0.316 (10 dB SNR), and the interferer's amplitude was varied between 0.0 and 10.0. In FIG. 7A for Scenario I, the MSE improves very little as the SINR of antenna 1 is increased from −20 dB to −10 dB. However, recall from Table 2 that the SINR of antenna 2 is fixed at −4.0 dB. Once the SINR of antenna 1 surpasses the SINR of the reference signal (antenna 2), the MSE drops much faster. A similar effect can be seen in Scenario II, but it is far less pronounced. In FIG. 7B it is evident that the SINR of the reference signal (antenna 2) has little effect on the performance of the filter in Scenario I. For the case where the SOI has an appreciably larger bandwidth than the interferer (Scenario II), the SINR of the reference signal appears to be much more important.

It is also interesting to compare the cost of choosing a low SINR reference signal versus having low SINR input branches. Compare FIGS. 7A and 7B, noting the difference in scales for the y-axis. For relatively broad interferers (as in Scenario I) one should choose the lowest SINR antenna as the reference signal. However, when the interferer is narrow (as in Scenario II), there may be some low SINR cases where the performance will be better if a higher SINR antenna is used for the reference.

Considerations relevant to practical implementation of the inventive methods discussed herein will now be discussed.

Choosing Adaptive Filtering Vs. Multidimensional Wiener Filtering

The first consideration is whether to use an adaptive algorithm such as PCLMS or LMS, or to solve the multidimensional Wiener filtering equation (16) directly. If the SOI is expected to maintain a fairly constant amplitude and if the FDOA is known precisely, then adaptive filtering is not strictly warranted; estimating the inverse of the autocorrelation and the cross-correlation to solve for the filter coefficients will generally produce superior results. For bursty signals one might consider estimating the timing of each burst. Once this is known, it is possible to solve for the filter coefficients for each burst and to apply this 'optimal' filter to each one. In effect this method adapts to the signal and collection conditions on a burst-by-burst basis. If burst timing is unknown and the bursts are sparse in the collection, then adaptive filtering should provide some advantage. An additional use case for PCLMS adaptive filtering is the case where the FDOAs are unknown. If the TDOA estimates are accurate and the signal and interferer are well-separated along TDOA, then one may initialize PCLMS assuming zero FDOA. The algorithm converges to the correct FDOA while mitigating interference.

Branch Selection

For an infinite number of samples, adding additional (but appropriate) branches should improve the filter's performance; however, in practice branches with a relatively small DSC may add noise and interference to the output. This means that there are cases where a simpler filter will be more effective than an expensive filter. This is often the case for branches using cycle frequencies. The size of these DSCs are attenuated by the roll-off of the signal pulse shape. In the results shown in Table 1 and Table 2, we used simulated SOIs with a 0.33 roll-off; this is large enough for the cycle frequency-shifted branches to produce a reduction in MSE. For signals with a smaller roll-off, this is unlikely to hold. Indeed, in the limit where the roll-off goes to zero, one expects that cycle frequencies will be useless, and these branches will only add noise and interference to the result. One should consider what roll-offs are expected in the SOI(s) and test a data set to see if cycle frequency branches increase or decrease performance.

For branches using the complex conjugate of the received signals, it is important to consider the modulation type of the SOI(s). If the modulation is known beforehand and if conjugate branches are appropriate for the modulation type, then these branches may be included. If the modulation type is unknown, then the conjugate branches may reduce the filter's performance.

Choosing the Reference Antenna

The MSE of the filter output depends more strongly on the SINR of the input antenna(s) than the SINR of the reference antenna (see FIGS. 7A, 7B). Thus, a good rule-of-thumb is to choose the reference antenna as the antenna with the lowest SINR. However, when there are more than two antennas, one may wish to entirely remove antennas with unusually low SINR from the filter.

Choosing the Number of Filter Taps

The number of filter taps effectively sets a width in TDOA which MFRESH targets for filtering. The width of a signal's peak in the Cross Ambiguity Function goes as the inverse of the signal's bandwidth. If one wishes MFRESH to pick up most of this energy, then a good estimate for an appropriate number of taps is $2f_s/B$, where $f_s$ is the sample rate and B is the signal's Bandwidth. However, in cases where the interferer and the SOI are close in TDOA (compared to the inverse of their bandwidths), then it is likely better to choose a smaller number of taps. The goal is to reduce the TDOA "search width" of the filter to avoid picking up unwanted energy from the interferer.

Choosing Adaptive Filtering Parameters

There are two step sizes in the PCLMS algorithm, $\mu$ which controls the update size for the filter coefficients and $\lambda$ which controls the update size for the phase correction. First, consider the filter coefficients. This part of the algorithm is equivalent to LMS filtering. Values between 0.001 and 0.0001 typically work well if the signals from each antenna have been normalized to a variance of one.

For the phase correction update, it is useful to consider the expected size of FDOA and cycle frequency errors. Note that, if one assumes that the cycle frequencies are known exactly, the estimated FDOA error in the l-th branch is $\Delta v_l \approx \Delta \theta_l f_s$ once the filter has converged. This implies that a step size of $\lambda = 0.1/f_s$ corresponds to a FDOA error update on the order of 0.1 Hz, for appropriately normalized signals. Parametrizing the phase compensation step size in this way provides an intuitive way to think about the parameter. As a rule-of-thumb a rough estimate of the lower limit for the number of samples which must be filtered before the phase compensation converges is $N_{convergence} > \Delta v_s/2\lambda f$; the factor of ½ comes from an extra factor of two that enters the gradient (Eq. (24)) due to our definition of the MSE objective function. It is also worth noting that the results shown in FIGS. 5A and 5B indicate that the MFRESH filter will perform well with FDOA errors as large as 10 Hz even if phase compensation is not used.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of detecting a signal of interest (SOI), the method comprising:
    providing a plurality of spaced-apart receiving antennas;
    receiving, from the plurality of spaced-apart receiving antennas, respective input signals containing the signal of interest;
    generating shifted input signals by applying time delays to the respective input signals of a magnitude operable to synchronize a signal arriving at the receiving antennas from a predetermined position, and applying frequency shifts to the respective input signals operable to cancel a Doppler frequency shift induced in the input signals by an emitter moving in a predetermined manner with respect to the receiving antennas;
    receiving a reference signal sharing at least a first characteristic with the SOI;
    applying a set of respective filters to the shifted and delayed input signals and summing resultant filter outputs to produce an output signal,
    wherein, the set of respective filters is selected to reduce an error metric indicating a degree of difference between the output signal and the reference signal.

2. The method of claim 1 wherein applying the set of respective filters includes, during a first time period:
    receiving, from a user, a time parameter, the time parameter indicating a length of time;
    selecting, as partial input signals, respective portions of each shifted input signal received during the first time period, each portion having a duration corresponding to the time parameter;
    performing a filter generation process to produce a respective set of filter coefficients for each input signal using the partial input signals received during the first period, the filter generation process including:
        determining the respective sets of filter coefficients such that, when filters defined by the respective sets of filter coefficients are applied to the partial input signals and the filtered partial input signals are summed to produce the output signal, the error metric is minimized.

3. The method of claim 2 wherein the reference signal is generated according to a method comprising:
    selecting a first estimated cycle frequency of the SOI;
        selecting one of the input signals received from one of the plurality of spaced-apart receiving antennas; and
        frequency-shifting the selected input signal received from the one of the plurality of spaced-apart receiving antennas by an integer multiple of the first estimated cycle frequency.

4. The method of claim 3 wherein the method further comprises providing at least one of the following as input to the filter generation process for each antenna:
    (a) the input signal for that antenna,
    (b) the complex conjugate of the input signal for that antenna, and
    (c) the input signal for that antenna frequency-shifted by an integer multiple of the first estimated cycle frequency.

5. The method of claim 3 wherein the method further comprises selecting a second estimated cycle frequency of the SOI;
    and wherein the reference signal is further generated according to a method comprising frequency-shifting the selected input signal by an integer multiple of the second estimated cycle frequency.

6. The method of claim 5 wherein the method further comprises providing at least the following as input to the filter generation process:
    a particular input signal frequency-shifted by an integer multiple of the first estimated cycle frequency; and
    the particular input signal frequency-shifted by an integer multiple of the second estimated cycle frequency.

7. The method of claim 2 wherein the method further includes, during a second time period:
    selecting, as the partial input signals for the second time period, respective portions of each shifted input signal received during the second time period, each portion having a duration corresponding to the time parameter; and
    updating the respective set of filter coefficients for each of the partial input signals by performing the filter generation process using the partial input signals selected for the second time period.

8. The method of claim 7 wherein updating the respective set of filter coefficients by performing the filter generation process includes adaptively applying phase corrections to one or more of the partial input signals to further minimize the error metric.

9. The method of claim 7 wherein the received reference signal is a simulated reference signal having a set of reference signal parameters; and
wherein updating the respective set of filter coefficients by performing the filter generation process includes varying one or more of the reference signal parameters to achieve at least one of the following:
further reducing the error metric;
maximizing the filter output, and
optimizing the intensity of the filter output cross-correlation with the simulated reference signal.

10. The method of claim 9 wherein the set of reference signal parameters includes one or more of the following:
a frequency modulation index;
a phase modulation index;
an amplitude modulation depth;
a subcarrier spacing;
a set of allowed phase shifts corresponding to a set of allowed digital symbols; and
a filter bandwidth parameter corresponding to a filtering process used during generation of the simulated reference signal; and
a known modulation sequence.

11. A method of detecting unknown signals comprising:
receiving initial cross ambiguity function (CAF) data, each initial CAF datum indicating a degree of correlation between a reference input signal and a second input signal upon application of a particular time delay and a particular frequency shift to the second input signal;
generating, for each initial CAF datum:
a shifted input signal by applying the particular time delay and the particular frequency shift corresponding to that initial CAF datum to the second input signal; and
a filtered reference signal by computing a first filter such that application of the first filter to the reference input signal minimizes an error metric indicating a degree of difference between the filtered reference signal and the shifted input signal, and applying the first filter to the reference signal;
a filtered input signal by computing a second filter such that application of the second filter to the shifted input signal minimizes an error metric indicating a degree of difference between the filtered input signal and the reference input signal, and applying the filter to the second input signal;
computing, for each initial CAF datum, enhanced CAF data, each enhanced CAF datum indicating a degree of correlation between the filtered reference signal and the filtered input signal for a corresponding time delay and a corresponding frequency shift; and
identifying pairings of time delay and frequency shift in the enhanced data where the degree of correlation is greater than the degree of correlation in the initial data for the same pairings of time delay and frequency shift by more than a threshold.

12. The method of claim 11, further comprising receiving a cycle frequency associated with the initial CAF data;
wherein generating the shifted input signal includes applying an additional frequency shift corresponding to an integer multiple of the cycle frequency to the second input signal; and
wherein computing the enhanced CAF data includes applying the additional frequency shift to the filtered input signal.

* * * * *